United States Patent [19]

Torii et al.

[11] Patent Number: 5,204,427
[45] Date of Patent: Apr. 20, 1993

[54] METHOD OF MAKING RING-OPENED POLYNORBORNENE POLYMERS USING POT LIFE EXTENDING AGENTS

[75] Inventors: Masao Torii, Kurashiki; Tomoo Sugawara, Kawasaki; Kin-ichi Okumura, Kamakura; Motoyuki Yamato, Kanagawa, all of Japan

[73] Assignee: Nippon Zeon Co., Ltd., Tokyo, Japan

[21] Appl. No.: 708,079

[22] Filed: May 24, 1991

Related U.S. Application Data

[63] Continuation-in-part of Ser. No. 606,810, Oct. 31, 1990, abandoned.

[30] Foreign Application Priority Data

Nov. 1, 1989 [JP] Japan ................................ 1-285555
Nov. 1, 1989 [JP] Japan ................................ 1-285556

[51] Int. Cl.$^5$ ............................................. C08G 61/08
[52] U.S. Cl. ..................................... 526/282; 526/127; 526/161; 526/169; 526/281; 526/902; 524/851; 524/856; 525/289; 525/290; 264/328.2; 264/331.13

[58] Field of Search ............... 526/169, 281, 282, 283, 526/902, 161, 127; 525/289, 290; 524/851, 856

[56] References Cited

U.S. PATENT DOCUMENTS 4,943,621 7/1990 Janda et al. ...................... 526/283 X

FOREIGN PATENT DOCUMENTS 0264260 4/1988 European Pat. Off. ............ 526/282
63-12612 1/1988 Japan .
3012612 1/1988 Japan .................................. 526/283

*Primary Examiner*—Fred Teskin
*Attorney, Agent, or Firm*—Thoburn T. Dunlap

[57] ABSTRACT

A reaction solution comprising a mixture of tricyclopentadiene, a norbornene monomer with at least 3 rings in its backbone, a 5-alkenyl-2-norbornene pot life adjusting agent along with a molybdenum type catalyst system gives prolonged pot life without extending time to exotherm (e.g., smoking time). By utilizing this reaction solution it is possible to bulk polymerize reinforced or unreinforced articles in a mold via ring-opening polymerization. Articles so obtained have good outward appearance and excellent physical properties.

45 Claims, No Drawings

METHOD OF MAKING RING-OPENED POLYNORBORNENE POLYMERS USING POT LIFE EXTENDING AGENTS

This application is a continuation-in-part of copending application Ser. No. 07/606,810 filed Oct. 31, 1990, now abandoned.

BACKGROUND OF THE INVENTION

1. Technical Field

This invention relates to a method for making norbornene polymers. Particularly, this invention relates to the ring-opening polymerization of norbornene monomers in the presence of a metathesis catalyst system. More particularly, the present invention pertains to the bulk ring-opening polymerization of a solution of norbornene monomers containing a pot life adjusting agent. This invention also relates to long pot life formulations for producing norbornene type polymers having a high thermal deformation temperature, a high modulus of elasticity, and improved impact strength.

2. State of the Art

The technique of bulk ring-opening polymerization of norbornene type monomers such as alkyl substituted norbornene, dicyclopentadiene and tricyclopentadiene by means of a molybdenum and/or tungsten compound metathesis catalyst within a mold is well known as disclosed in U.S. Pat. No. 4,380,617.

Generally, bulk ring-opening polymerization in a mold, e.g., reaction injection molding (RIM), is conducted by mixing a norbornene type monomer with a metathesis catalyst and cocatalyst (activating agent) in the absence of a solvent, conveying the reactive mixture to a mold, then letting the polymerization reaction take place to form a solid article. After mixing, polymerization commences and the viscosity of the reaction solution increases until passing the point where fluidity is almost lost. The time it takes the system to reach this point after mixing is called pot life. Stated differently, pot life is the time interval between the mixing of the reactive ingredients to form the reactive solution and the point where the solution becomes too viscous (e.g. gels) to adequately fill a mold. After this point the polymerization reaction progresses rapidly and the gel converts to a solid (e.g., a high conversion of monomer to polymer is achieved). An exotherm is associated with the rapid polymerization rate causing the unconverted monomer to vaporize when its boiling point is reached. The vaporization of unconverted monomer gives the system the appearance of smoking. Accordingly, the time interval it takes from mixing the reactants to the point at which the exotherm (e.g. smoke is produced) is attained is defined as the smoking time.

Early attempts at bulk polymerization produced reactions that were too rapid and, therefore, uncontrollable. The combination of molybdenum or tungsten catalyst and a cocatalyst such as alkylaluminum halide proved to be too active; progressing rapidly even at the room temperature. For this reason, methods have been proposed to prolong the pot life of bulk polymerizable reactive monomer formulations and to prevent premature polymerization. Approaches to improve catalyst systems by utilizing ether, ester, ketone, or nitrile activity adjusting agents have been proposed as disclosed in Japanese Patent Application Nos. 58-129013, 61-120814, and 61-179214.

However, in conventional techniques pot life is still inadequate, leading to operational difficulties in molding. The premature increase in viscosity of the reaction solution makes it difficult to uniformly convey the reaction solution throughout the mold, resulting in molded products with flow marks or weld lines that are generated by non-uniform polymerization. This leads to products of poor surface quality and reduced physical properties.

Moreover, in cases where a reinforcing material such as glass fiber is placed within the mold prior to the introduction of the reaction solution (to make fiber-reinforced products), viscous reaction solutions may cause the shifting of the reinforcing fiber within the mold or insufficient permeation of the reaction solution into the reinforcing fiber matrix.

In a further development, a method to improve pot life by using a tertiary alcohol in conjunction with an alkylaluminum or alkylaluminum halide cocatalyst has been proposed as disclosed in Japanese Patent Application No. 63-332776. Although pot life is prolonged by this method, smoking time is also prolonged along with it. In some cases, the polymerization activity is reduced, and a high conversion ratio can not be attained.

Tricyclic norbornene type monomers such as dicyclopentadiene (DCP) are widely used since they are industrially easy to obtain. However, when tricyclopentadiene (TCP) is used as a comonomer is raise the heat resistance of poly(DCP)resin, the pot life of the reaction solution is shortened. Furthermore, as the amount of TCP is increased, the impact resistance of the polymer product decreases.

In the bulk ring-opening polymerization of norbornene type monomers, the objective is to balance ease of operation, moldability, and productivity with the physical properties of the polymer product so obtained. In other words, premature polymerization of the reaction solution at the initial stages of the molding operation must be prevented. The reaction components and additives must be mixed completely, change of viscosity during the feeding of the solution into the mold must be curbed, and the solution must be polymerized immediately after feeding it into the mold. Moreover, the physical properties of the polymer product must be acceptable.

Therefore, it is important to control the reaction solution so that the pot life can be prolonged without overly prolonging the smoking time.

SUMMARY OF THE INVENTION

It is a primary object of the present invention to shorten the molding cycle time of a bulk polymerizable solution of a norbornene type monomer by prolonging its pot life while not prolonging its smoking time.

It is another object of the present invention to improve the ease of operation in the bulk ring-opening polymerization of a norbornene type monomer.

It is a further object of this invention to obtain molded reinforced or non-reinforced products with good outward appearance and physical properties, by curbing viscosity changes of the reaction solution during the feeding of the solution into a mold.

It is a still further object of this invention to provide a method for the production of molded reinforced articles without the shifting of the reinforcing material in the mold during the mold fill step.

A still further object of this invention is to prevent the insufficient permeation of the reaction solution into the reinforcing materials during the mold fill step.

A further object is to provide a long pot life feed composition that is in-mold bulk polymerizable into articles with a high thermal deformation temperature, a high modulus of elasticity, and improved impact resistance.

Broadly stated, the foregoing objects are achieved by using a metathesis catalyst system comprising a molybdenum type metathesis catalyst, a cocatalyst, and a pot life adjusting agent selected from 5-alkenyl-2-norbornenes in conjunction with tricyclopentadiene and a norbornene monomer(s) having at least 3 rings in its backbone. In another embodiment, a monomer incompatible elastomer is added to the reactant solution to improve the physical properties of the polymer polymerized therefrom.

The pot life extending agents of this invention contain alpha-olefin unsaturation. Without being bound by a specific theory of invention, it is believed that the carbon-carbon double bond of the alpha-olefin moiety inhibits chain growth during the initial stage of the metathesis reaction.

In the past, it has been proposed to add various acyclic olefins to the reaction solution as molecular weight adjusting agents during the ring-opening polymerization of norbornene type monomers. However, when olefins such as 1-dodecene, 1,6-heptadiene, styrene, or divinylbenzene are added to a bulk polymerizable norbornene monomer solution, there is hardly any effect of prolonging pot life. Although some prolonging of pot life can be observed when a large amount of the foregoing olefins are added, the physical properties of the obtained polymer, such as the glass transition temperature (Tg), deteriorate.

Other proposals have included cross-linked polymerization products between 5-alkenyl-2-norbornenes and dicyclopentadiene as disclosed in Japanese Patent Application No. 63-12612. Methods of making copolymers and homopolymers of 5-alkenyl-2-norbornenes and 5-ethylidene-2-norbornene was disclosed in Japanese Patent Application No. 63-7610. However, in these disclosures, tungsten halides and oxyhalides are used as the metathesis catalyst. Although tungsten compounds are high activity metathesis catalysts, 5-alkenyl-2-norbornenes have little affect, if any, in prolonging pot life.

Therefore, it was an unexpected discovery that the aforementioned 5-alkenyl-1-norbornene combination with norbornene monomers and TCP can prolong the pot life without substantially delaying the smoking time.

In order to obtain polymers with high heat deformation temperature, a norbornene type monomer mixture containing monomers having at least three or more rings in its backbone are utilized. At least one of the monomers must be tricyclopentadiene (symmetrical and unsymmetrical trimers of cyclopentadiene) depicted by the following structures:

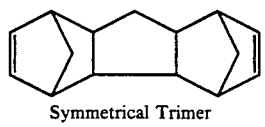

Symmetrical Trimer

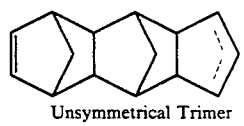

Unsymmetrical Trimer

Those skilled in the art will recognize that the double bond in the 5-membered monocyclic ring of the unsymmetrical timer can be located in either of the two positions indicated by the dashed bond representation.

Examples of the norbornene type monomers with three or more rings (i.e., tricyclic, tetracyclic, pentacyclic, and the like) are: three-ring monomers such as dicyclopentadiene, dihydrodicyclopentadoene, cyclopentadiene/methylcyclopentadiene codimer, and 1,4-methano-1,4,4a,5,6,7,8,8a-octahydronaphthalene; four-ring monomers such as tetracyclododecene, methyltetracyclododecene, ethyltetracyclododecene, dimethyltetracyclododecene, ethylidenetetracyclododecene, vinyltetracyclododecene phenyltetracyclododecene. If desired, tetracyclododecene with polar substituents, such as, for example, halogen, ester, ether, cyano, imido and pyridyl groups, and the like can be employed. The tricyclic and/or the tetracyclic norbornene type monomers are preferred. Of these dicyclopentadiene (DCP) is most desirable, in terms of obtainability.

These norbornene type monomers can be used alone or in combinations thereof with tricyclopentadiene.

In standard formulations of the present invention, the amount of tricyclopentadiene (TCP) in the norbornene monomer mixture can range between about 5 to about 60 weight percent and preferably between about 10 to about 50 weight percent of the total monomer mixture. The amount of other norbornene monomer(s) copolymerizable therewith can range between about 95 to about 40 weight percent and preferably between about 90 to about 50 weight percent of the total monomer mixture. An effective amount of a pot life extending agent selected from the structural formula set forth in the formula hereinbelow is combined with the monomer mixture.

When polymer products with enhanced physical properties are desired (i.e., excellent bending modulus of elasticity, high thermal deformation temperature, and improved impact resistance), formulations employing a monomer mixture comprising: (a) about 10 to 50 weight percent of a tricyclic and/or tetracyclic norbornene type monomer; (b) about 10 to 50 weight percent TCP (all weight percents based on the weight of the monomer(s) in the formulation); (c) an effective amount of a pot life extending agent selected from a compound set forth in the structural formula hereinbelow; and (d) a hydrocarbon based elastomer with a solubility parameter of less than 8.2 are utilized.

A DCP/TCP monomer mixture can be obtained by heat-processing dicyclopentadiene in an inert gas atmosphere at 120° to 250° C. for 0.5 to 20 hours. In this case, a monomer mixture containing 40 to 95 weight percent, and more preferably 60 to 95 weight percent (based on the monomer mixture) DCP is desirable. Accordingly, TCP and higher homologs thereof will be present in the amount of 60 to 5 weight percent, and more preferably 40 to 5 weight percent (of the total monomer mixture). The TCP compounds can be separated from the mixture by known methods (See, for example, U.S. Pat. No. 3,790,545) or can be utilized without separation.

In addition, it is possible to use the following monomers as copolymerizable monomers with TCP so long as their use does not defeat the objective of this invention. Suitable two-ring norbornene type monomers that can be polymerized along ith the above disclosed other tricyclic or higher cyclic norbornene by type monomers are 2-norbornene, 5-methyl-2-norbornene, 5-ethyl-2-norbornene, 5-butyl-2-norbornene, 5-hexyl-2-norbornene, 5-ethylidene-2-norbornene, 5-phenylnorbornene. Suitable monocyclic olefins include cyclobutene, cyclopentene, cyclopentadiene, cyclooctane, and cyclododecene.

The pot life adjusting agents of the present invention are selected from 5-alkenyl-2-norbornene(s) (and 2,5-norbornadienes) represented by the following formula:

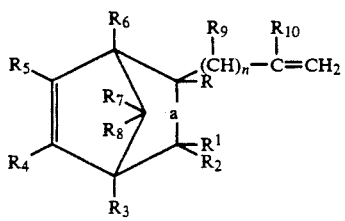

wherein R, $R_1$, and $R_2$ independently represent hydrogen, $C_1$ to $C_6$ alkyl and monomethyl, monochloro and dichloro substituents thereof, $C_2$ to $C_6$ (preferably $C_2$ to $C_3$) alkenyl and monomethyl, monochloro and dichloro substituents thereof; $R_3$, $R_4$, $R_5$, $R_6$, $R_7$ and $R_8$ independently represent hydrogen, a methyl group or a halogen atom; $R_9$ and $R_{10}$ independently represent hydrogen or $C_1$ to $C_6$ alkyl; n is 0 to 4 (preferably 0 or 1) and "a" represents a single or double bond with the proviso that when "a" is a double bond, R and $R_1$ are not present.

Specific examples of foregoing pot life adjusting agents are 5-vinylbicyclo [2,2,1]hepto-2-ene (VND), 5-isopropenylbicycl[2,2,1]hepto-2-ene (IPN), 5-vinyl-4-vinyl-4-vinylbicyclo[2,21]hepto-2-ene, 5-propenyl-bicyclo[2,2,1-hepto-2-ene, 5-butyenyl-bicyclo[2,2,1]hepto-2-ene, 5-pentenyl-bicyclo[2,2,1]hepto-2-ene; and their monomethyl, monochloro, and [substitutes of the above;] dichloro substituents such as, for example, 5-alpha-chlorovinylbicyclo[2,2,1]hepto-2-ene. 5-vinylbicyclo 2,2,1]hepto-1,4-diene, which is a Diels-Alder reaction product of cyclopentadiene and vinylacetylene, is another example of a pot life adjusting agent useful herein.

Among the above pot life extending agents, VNB and IPN are most desirable, since they are easiest to obtain. They can be made by the Diels-Alder reaction products of butadiene or isoprene and cyclopentadiene. They also can be obtained inexpensively from the $C_5$ fraction of naphtha cracking followed by purification.

The amount of pot life adjusting agent employed should be at least 0.5 weight parts per 100 weight parts of norbornene monomer with three or more rings, preferably about 1 to about 60 weight parts, and more preferably about 5 to about 45 weight parts. If high impact formulations (i.e. formulations employing elastomer(s) having a solubility parameter of less than 8.2) are used, the amount of pot life extension agent employed ranges from about 40 to 80, preferably, 45 to 70 weight percent of the total monomer present in the reactive formulation. When the amount of pot life extension agent utilized is small, the effect of prolonging the pot life is reduced. On the other hand, if too much VNB is utilized, the glass transition temperature (Tg) of the resin (e.g., norbornene type polymer) is lowered.

The catalyst to be used in this invention can be any molybdenum compound metathesis catalyst system that is known for the ring-opening polymerization of the norbornene type monomer(s). Examples are the halides, oxyhalides, oxides, and organic ammonium salts of molybdenum; the most desirable are the organic ammonium salts that are described in Japanese Patent Application Nos. 58-127728 and 59-51911.

Specific examples of the molybdenum type metathesis catalyst are tridodecyl ammonium molybdate, methyltricapryl ammonium molybdate, tri(tridecyl)ammonium molybdate, trioctyl ammonium molybdate, molybdenum pentachloride, and molybdenum oxytrichloride.

Specific examples of useful cocatalysts (activating agent) are alkylaluminum halides, alkoxyalkylaluminum halides, aryloxyalkylalmuinum halides, and organic tin compounds.

In the case of alkylaluminum halides, it should be noted that these cocatalysts tend to be very active. Accordingly, polymerization begins immediately upon mixing with a catalyst. Therefore, a moderating agent such as an ether, ester, ketone, nitrile, or alcohol may be utilized to moderate the action of the cocatalyst as disclosed in Japanese Patent Application Nos. 58-129013 and 61-120814.

In addition to the catalyst and the cocatalyst, it is also possible to use a hydrocarbon halide as a polymerization enhancing agent such as hexachlorocyclopentadiene as disclosed in Japanese Patent Application No. 60-79035, and halide metals such as silicon tetrachloride, germanium tetrachloride, and lead tetrachloride as disclosed in Japanese Patent Application No. 63-186730.

As for the amounts of the metathesis catalyst to employ, approximately about 0.01 to 50 millimoles, or preferably about 0.1 to 20 millimoles, is used per 1 mole of the monomer. As for the cocatalyst (the activating agent), about 0.1 to 20 (molar ratio) per catalyst component, or preferably about 1 to 10 (molar ratio), is used.

it is preferred that the metathesis catalyst and the activator be dissolved in the monomer. However, as long as it is within a range where there is essentially no loss of properties in the product, the catalyst and cocatalyst can also be suspended or dissolved in a small amount of solvent.

In this invention, the norbornene type monomer is polymerized by bulk ring-opening polymerization within a mold by the use of a metathesis catalyst. As long as it is essentially a bulk type polymerization, it is all right for a small amount of inert solvent to be present in the system.

In a preferable polymerization method, the norbornene type monomer is divided into two portions and put into two different contains; to one container, the metathesis catalyst is added, and to the other container, an activating agent is added. After mixing the two reactant solutions and feeding the reactive mixture into a mold, the ring-opening polymerization is conducted.

In this invention, an impingement mixing device, which is a well-known reaction injection molding (RIM) device, can be used to mix the two reactant solutions. In this case, the containers containing each of the reactant solutions become the sources for supplying two different feed streams. Mixing the two feed streams in the mixing head of the RIM machine, and then injecting the mixture into a high-temperature mold, products can be instantaneously molded by bulk ring-opening polymerization.

It is also possible to inject or pour the reactive solution into a preheated mold, after completing the mixing of the two reactant solutions as disclosed in Japanese Patent Application No. 59-51911 (U.S. Pat. No. 4,426,502).

This invention is not limited to the method in which two types of reactant solutions are used. As it can be easily understood by experts in the field, various variations of the method are possible, such as putting the monomer and a desired additive in a third container and using it as the source of a third feed stream.

The mold can be metal, resin, wood, cement, plastic, etc. However, from the economical standpoint, it is desirable to use molds constructed from resin.

The mold temperature should be more than ambient room temperature, or preferably, from about 40° to about 200° C., or more preferably, from about 50° to about 120° C. The mold clamping pressure should be within the range of from about 0.1 to about 100 kg/cm$^2$.

The polymerization time can be determined as needed. The time from feeding the reactive solution into the mold to the smoking time preferably should be within five minutes, or more preferably within two minutes.

In addition, the reactant and/or reactive solution is stored and handled in an inert gas atmosphere such as nitrogen gas. However, the mold does not necessarily have to contain inert gas.

In this invention, the reinforcing material (if utilized) is installed within the mold in advance, and the reactive solution is fed into the mold and polymerized in the presence of the reinforcing material.

Examples of the reinforcing material are glass fiber, aramide fiber, carbon fiber, super-high molecular weight polyethylene fiber, metal fiber, polypropylene fiber, aluminum coated glass fiber, cotton, acrylic fiber, boron fiber, silicon carbide fiber, and alumina fiber. Other examples are whiskers of potassium titanate or calcium sulfate.

Furthermore, these reinforcing materials can be used in various shapes, such as long fibers, chopped strands, mats, cloth, etc.

The reinforcing materials can be treated with a coupling agent for the purpose of improving the adhesiveness with the resin. Silane coupling agents are the most desirable.

There is no restriction to the amount of the reinforcing material utilized. Generally, 20 weight percent, or preferably from about 30 to about 70 weight percent (based on the total weight of the molded article), is used.

By adding various additives, such as oxidation inhibitors, filling agents, dyes, coloring agents, foaming agents, flame retarding agents, elastomers, dicyclopentadiene type thermal polymerization products and hydrates thereof, it is possible to improve the properties of the polymer obtained by the method of the present invention.

For the oxidation inhibitors, there are various type for plastics and rubbers, such as the phenols, phosphorus compounds and amines.

For the filling agent, there are inorganic filling agents, such as milled glass, carbon black, talc, calcium carbonate, mica.

Suitable elastomers include natural rubber, polybutadiene, polyisoprene, styrene-butadiene copolymer (SBR), styrene-butadiene-styrene block copolymer (SBS), styrene-isoprene-styrene block copolymer (SIS), ethylene-propylene-diene terpolymer (EPDM), ethylene vinyl acetate copolymer (EVA) and hydrides of the above.

Quite unexpectedly, it was discovered that the impact strength of the polymers prepared from the formulations of the present invention can be improved by employing as elastomer of low compatibility with the norbornene type monomers contained therein. For improved impact strength, elastomers with a solubility parameter (SP value) of less than 8.2 are employed in the monomer formulation. Suitable elastomers include natural rubber (SP value 8.0), ethylene-propylene rubber (EPT or EPDM, SP value 7.9), butyl rubber (SP value 7.8), polyisoprene (SP value 8.0), and the like. The amount of low compatibility elastomer employed ranges from about 1 to 10 parts, preferably about 2 to 6 parts by weight per 100 parts by weight of monomer employed.

The above-described additives are to be mixed in one or both of the reaction solutions in advance.

The following examples will show one skilled in the art how to operate within the scope of the present invention and are not intended to serve as a limitation on the scope thereof. In these examples, all parts are parts by weight and all percentages are percentages by weight unless otherwise indicated.

EXAMPLES 1-10

This example demonstrates the pot life adjusting properties of the additives of the present invention.

A mixed monomer solution was made by mixing dicyclopentadiene (DCP) (purity of 99.3 percent), tricyclopentadiene (TCP) (a mixture of non-symmetrical type 80 percent and symmetrical type 20 percent) (purity 96.1 percent), and 5-vinylbicyclo [2,2,1]hepto-2-ene (VNB) (purity 99.8%) in the proportions shown in Table 1; 20 ml of the mixed monomer solution was placed in a glass reaction vessel which was kept at 35° C.

To the above vessel, diethylaluminum chloride (DEAC) 20 millimole/liter, n-propyl alcohol 20 millimole/liter, silicon tetrachloride 10 millimole/liter, and tri(dodecyl)ammonium molybdate 5 millimole/liter was added, and mixed.

The time it took from the beginning of mixing until the reaction solution gelled was measured as the pot life (PL). The time from the beginning of the mixing until the generation of slight smoke was measured as the smoking time (SMT).

These operations were conducted in the nitrogen gas atmosphere. The glass transition temperature (Tg) and the invert ratio of the obtained resin were measured. The results are shown in Table 1.

It is clear from Table 1 that with the three component system containing TCP, the glass transition temperature (Tg) of the obtained polymers increased. From Examples 7 to 9, it can be seen that the pot life is relatively short with respect to the DCP or DCP/TCP system (without VNB). Pot life can be prolonged and the SMT/PL ratio reduced by adding even small amounts of VNB as shown in Example 10.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Monomer Mixture | | | | | | | | | | |
| DCP (%) | 87 | 62 | 85 | 60 | 75 | 50 | 90 | 65 | 100 | 95 |
| TCP (%) | 10 | 35 | 10 | 35 | 10 | 35 | 10 | 35 | 0 | 0 |
| VNB (%) | 3 | 3 | 5 | 5 | 15 | 15 | 0 | 0 | 0 | 5 |
| Polymerization Activity | | | | | | | | | | |
| PL (sec.) | 18 | 25 | 24 | 39 | 40 | 81 | 5 | 11 | 18 | 48 |
| SMT (sec.) | 38 | 48 | 42 | 65 | 47 | 90 | 31 | 51 | 55 | 64 |
| SMT/PL | 2.1 | 1.9 | 1.8 | 1.7 | 1.2 | 1.1 | 6.2 | 4.6 | 3.1 | 1.3 |
| Polymer Properties | | | | | | | | | | |
| Tg (°C.) | 155 | 182 | 152 | 179 | 136 | 162 | 152 | 181 | 148 | 139 |
| Invert Conversion (%) | 98.9 | 98.9 | 98.9 | 98.8 | 98.7 | 99.0 | 98.5 | 98.4 | 98.7 | 98.9 |

EXAMPLES 11-12

These examples illustrate the use of a tungsten catalyst system which is not an embodiment of the present invention.

20 ml of the norbornene monomer mixtures shown in Table 2 were placed in a glass reaction vessel. To the vessel were added 19 millimole/liter of DEAC and 65 millimole/liter of di-n-butylether along with 1.9 millimole/liter of tungsten hexachloride. The rest of the experiment was conducted in the same manner as set forth in Examples 1 to 10.

The data of PL and SMT are shown in Table 2. From the results it can be seen that when a tungsten type metathesis catalyst is used, regardless of the presence of VNB, the SMT/PL ratio is relatively large and the interval between PL and SMT is long.

TABLE 2

| | Example | |
|---|---|---|
| | 11 | 12 |
| Monomer mixture | | |
| DCP (%) | 90 | 81 |
| TCP (%) | 10 | 9 |
| VNB (%) | 0 | 10 |
| Polymerization Activity | | |
| PL | 35 | 58 |
| SMT | 107 | 149 |
| SMT/PL | 3.1 | 2.6 |

EXAMPLES 13-17

Examples 13 to 17 were conducted in the same manner as Examples 1 to 10 except that VNB was replaced with 5-isopropenylbicyclo[2,2,1hepto-2-ene (IPN) in the composition ratios shown in Table 3. The results are shown in Table 3.

From the results set forth in Table 3, it can be seen that IPN has the same effect as VNB. IPN has a higher boiling point than VNB, making molding operations easier, and giving polymers with high Tg.

TABLE 3

| | Examples | | | | |
|---|---|---|---|---|---|
| | 13 | 14 | 15 | 16 | 17 |
| Monomer Mixture | | | | | |
| DCP (%) | 80 | 60 | 55 | 35 | 0 |
| TCP (%) | 10 | 10 | 35 | 35 | 0 |
| IPN (%) | 10 | 30 | 19 | 30 | 100 |
| Polymerization Activity | | | | | |
| PL (sec.) | 53 | 65 | 61 | 83 | 172 |
| SMT (sec.) | 73 | 78 | 85 | 94 | 174 |
| SMT/PL | 1.4 | 1.2 | 1.4 | 1.1 | 1.0 |
| Polymer Properties | | | | | |
| Tg (°C.) | 157 | 136 | 183 | 164 | * |
| Invert Ratio (%) | 98.8 | 97.8 | 98.7 | 98.2 | — |

*elastomer-like appearance

EXAMPLE 18

This example was conducted in the same manner as Examples 1 to 10 except that the monomer mixture comprised DCP, TCP, and methyltetracyclododecene (MTD) in the amounts of 60, 10 and 25 percent, respectively. VNB in the amount of 5 percent was utilized as the pot life adjusting agent.

The polymerization activity of the system was as follows: PL was 33 seconds; SMT was 54 seconds; and the SMT/PL ratio was 1.6. The Tg of the polymer was 165° C., and the invert ratio was 98.8 percent.

EXAMPLE 19

Into a vessel was placed 90 parts of DCP, 10 parts of TCP and 1000 ppm of 2,6-di-t-butyl-4-hydroxytoluene (BHT), 3.5 parts of styrene-isoprene-styrene block elastomer (SIS, made by Nippon Zeon K.K. Quintack 3421) was added to the mixture and dissolved. To the monomer mixture 41 millimole/liter of DEAC, 50 millimole/liter of n-propyl alcohol, and 20 millimole/liter of silicon tetrachloride were added and mixed (Solution A).

Into a separate vessel, 6 parts of BHT and 3.5 parts of SIS were dissolved into a monomer mixture of 80 parts of DCP, 9 parts of TCP, and 11 parts of VNB. To the monomer mixture tri(dodecyl)ammonium molybdate was added in an amount so that its concentration in the mixture was 12 millimole/liter (Solution B).

From each of Solutions A and B, 100 ml was removed and mixed in a separate vessel.

The polymerization activity was measured as set forth in the previous examples. At 30° C., PL was 9 minutes 15 seconds and SMT was 14 minutes 28 seconds.

Separate aliquots of reaction Solutions A and B were mixed in a ratio of 1:1 using a gear pump and a power mixer. The mixed solution was fed into a mold having dimensions of 500 mm×500 mm×3 mm which was preheated to 60° C. under atmospheric pressure. The feed time took approximately 30 seconds. After feeding, the polymerization reaction proceeded for 90 seconds. A molded plaque was removed from the mold. The plaque had a good appearance without flow marks or weld lines. The Tg of the plaque was 143° C., the bending strength was 6.3 kg/mm², the bending elasticity was 195 kg/mm², and the notched Izod impact strength was an excellent value of more than 40 kg/cm².

EXAMPLE 20

This example was conducted in the same manner as Example 19, except that the monomer mixture of Solution B used 90 parts of DCP and 10 parts of TCP. No VNB was utilized.

The polymerization activity was as follows: PL was 2 minutes 50 seconds and SMT was 13 minutes 38 seconds at 30° C.

Flow marks and weld lines were observed on the surface of the molded plaque.

EXAMPLE 21-23

These examples were conducted in the same manner as Example 5, except that the compounds shown in Table 4 were substituted for the pot life adjusting agent. Results are shown in Table 4.

From Table 4, it can be seen that the norbornene compositions which are not substituted at the 5-position with an alkenyl group (e.g., terminal vinyl group) or a non-norbornene compound do not have the effect of reducing the interval between PL and SMT.

TABLE 4 with a silicone-type sizing agent and then treated with a styryl silane coupling agent.

Separately, a mixed norbornene type monomer solution was prepared utilizing DCP (99.3 percent purity), TCP (a mixture of 80 percent non-symmetrical trimer and 20 percent symmetrical trimer) (96.1 percent purity) and VNB (99.8 percent purity). These ingredients were mixed in the amounts shown in Table 5. Equal amounts of the mixed norbornene type monomer solution was placed into two reaction vessels. In one of the vessels, DEAC, n-propyl alcohol, and silicon tetrachloride were added so that their concentrations were 41 millimole/liter of monomer, 41 millimole/liter, and 20 millimole/liter, respectively (Solution A). The viscosity of Solution A was approximately 30 centipoise at 25° C.

In the other vessel, tri(tridecyl)ammonium molybdate was added in the amount of 10 millimole/liter of monomer (Solution B). The viscosity of Solution B was approximately the same as that of Solution A.

Both reaction solutions were mixed at a 1:1 ratio using a gear pump and power mixer. The mixture was then fed into the mold containing the fiber mat. The feed time was approximately 5 seconds. Before the addition of the reaction solution the mold was heated to 40° C.

After feeding the reactive monomer solution into the mold, the reaction proceeded for 90 seconds. The molded product was removed from the mold to observe the outward appearance and the filling condition of the resin. The results are shown in Table 5.

TABLE 5

| | Examples | | | | | |
|---|---|---|---|---|---|---|
| | 24 | 25 | 26 | 27 | 28 | 29 |
| Monomer Composition | | | | | | |
| DCP (%) | 87 | 85 | 75 | 95 | 90 | 65 |
| TCP (%) | 10 | 10 | 10 | 0 | 90 | 65 |
| VNB (%) | 3 | 5 | -15- | 5 | — | — |
| Molding Operation Properties of Reinforced Polymer | Easy | Easy | Easy | Easy | * | * |
| Filling Condition | Complete | Complete | Complete | Complete | bad | bad |
| Flow Marks | Some | None | None | None | numerous | numerous |
| Weld Lines | None | None | None | None | numerous | some |

*Pressure increase, glass mat shifted

| | Examples | | |
|---|---|---|---|
| Additive | 21 bicyclo [2,2,1] hepto-2-ene | 22 1,6-heptadiene | 23 6-vinyl-1,4,5,8-dimethano-1,4,4a,5,7,8,8a-heptahydro-naphthalene |
| Polymerization Activity | | | |
| PL (sec.) | 10 | 32 | 12 |
| SMT (sec.) | 38 | 63 | 41 |
| SMT/PL | 3.8 | 2.0 | 3.4 |
| Physical Properties of the Polymer | | | |
| Tg (°C.) | 129 | 85 | 159 |
| Invert Ratio (%) | 97.8 | — | 96.5 |

EXAMPLES 24-29

In a flat mold (dimensions: 3 mm × 200 mm × 200 mm) was placed a fiber mat consisting of three plies of chopped strand mats (450 g/m²) bound together with a polystyrene binding agent. The glass fibers were sized

EXAMPLES 30-31

These examples were conducted in the same manner as set forth in Examples 24-29, except that VNB was replaced with IPN, in the composition ratios shown in Table 6. The results are shown in Table 6.

TABLE 6

| | Examples | |
|---|---|---|
| | 30 | 31 |
| Monomer Composition | | |
| DCP (%) | 80 | 60 |
| TCP (%) | 10 | 10 |
| IPN (%) | 10 | 30 |
| Molding Operation Properties of Reinforced Polymer: | Easy | Easy |
| Filling Condition | Complete | Complete |
| Flow Mark | None | None |
| Weld Lines | None | None |

EXAMPLE 32

Into a mold with dimensions of 500 mm × 500 mm × 3 mm was placed a continuous strand glass fiber mat having a thickness of 3 mm (made by Sangoban; product name—U812, 450 g/m$^2$). The mold was preheated to 60° C.

Solutions A and B set forth in Example 19 were mixed in a ratio of 1:1, using a gear pump and power mixer. The mixed reaction solution was fed into the aforementioned mold with a pressure of less than 1.0 kg/cm$^2$ (the exhaust pressure of the gear pump). The feed time was approximately 25 seconds.

After completing the feed, the reaction proceeded for 90 seconds. The molded product was then removed from the mold. A flat reinforced plaque having a good outward appearance without flow marks or weld lines was obtained. The Tg of this plaque was 143° C., the bending strength was 15.8 kg/mm$^2$, the bending elasticity was 511 kg/mm$^2$, the notched Izod impact strength was an excellent value of more than 80 kg/cm. Specific gravity was 1.34, and the glass fiber content was 35 percent.

When this plaque plate was cut in cross-section, it was confirmed that the resin completely filled the spaces between glass fibers.

EXAMPLE 33

This example was conducted in the same manner as Example 32, except that the monomer mixture of Solution B used only 90 parts of DCP, 10 parts of TCP. VNB was not employed.

The reaction activity was as follows: PL was 2 minutes and 50 seconds and SMT was 13 minutes 38 second at 30° C.

Feeding of the reaction solution into the mold was conducted at a feed pressure reaching 3.0 kg/cm$^2$ (measured at the middle of the feed cycle). The feet time was approximately 25 seconds. After polymerization the molded plaque was removed from the mold.

The marks left by the shifting of the glass mat within the mold were observable in the plaque. There were many unfilled voids in the polymer matrix. Flow marks and weld lines were observed on the surface and within the molded product. Physical properties were not measured.

EXAMPLE 34

This example was conducted in the same manner as set forth in Example 32, except that the continuous strand glass fiber mat was replaced with 16 piles of styryl-silane treated fabric cloth (Asahi Fiber Glass K.K.; product name MS 250-1, 211 g/m$^2$). The feed pressure was less than 3 kg/m$^2$.

The obtained molded product had a good outward appearance, without flow marks and weld lines. The bending elasticity was 1700 kg/mm$^2$ and the specific gravity was 1.67. The fabric cloth content was 67%.

In addition, another experiment was conducted in the same manner as this example, but without using VNB. During injection of the monomer solution, the pouring pressure increased abnormally, and it was not possible to feed the reaction solution into the mold.

EXAMPLE 35

This example was conducted in the same manner as Example 34, except that the continuous strand glass fiber mat was replaced with 12 plies of carbon cloth (Tory, K.K.; product name Toreka #6343, 200 g/$^2$). The carbon cloth was washed in toluene and dried before it was placed in the mold. The mold feel pressure was less than 3 kg/m$^2$.

The obtained molded product had a good outward appearance, without flow marks and weld lines. The bending elasticity was 4500 kg/mm$^2$, specific gravity was 1.34, and carbon cloth content ratio was 59 percent.

EXAMPLES 36–44

A monomer solution was prepared by mixing monomer components selected from DCP, TCP 996.1% purity) containing 1000 ppm of BHT, VNB (99.8% purity), or mixtures thereof in the ratios set forth in Table 7. Three parts of an ethylene-propylene-ethylidenenorbornene elastomer (Mitsui EPT Grade 4045, Mitsui Sekiyu Kogyo) were dispersed into 100 parts of the monomer solution.

The solution was then divided into two equal portions and DEAC, n-propyl alcohol, and silicon tetrachloride were added to one of the portions to give a concentration of 41, 50 and 20 mmole/liter, respectively (hereinafter referred to as solution A).

To the other portion of the solution (tri(dodecyl) ammonium molybdate was added to give a 12 mmmole/liter concentration. Four parts of BHT also wer added (hereinafter referred to as solution B).

Solutions A and B were mixed at a 1:1 ratio by a gear pump and power mixer. The reactive mixture then was injected into a mold (preheated to 60° C.) having a cavity of 500 mm × 500 mm × 3 mm. The feed time was 30 seconds. After injection, the reaction proceeded for 90 seconds. The molded product was retrieved and its appearance and physical properties were characterized as shown in Table 7.

TABLE 7

| | Example No. | | | | | | | | |
|---|---|---|---|---|---|---|---|---|---|
| | 36 | 37 | 38 | 39 | 40 | 41 | 42 | 43 | 44 |
| Monomer composition | | | | | | | | | |
| DCP (%) | 35 | 15 | 12 | 100 | — | — | 50 | 50 | — |
| TCP (%) | 19 | 40 | 23 | — | 100 | — | 50 | — | 50 |
| VNB (%) | 45 | 45 | 65 | — | — | 100 | — | 50 | 50 |
| Reactivity | | | | | | | | | |
| PL (sec.) | 810 | 790 | 815 | 200 | * | 900 | 150 | 820 | 790 |
| SMT (sec.) | 815 | 800 | 820 | 790 | | 910 | 760 | 830 | 800 |
| SMT/PL (sec.) | 1.0 | 1.0 | 1.0 | 4.0 | | 1.0 | 5.0 | 1.0 | 1.0 |
| Properties of products | | | | | | | | | |
| Tg (°C.) | 151 | 170 | 125 | 147 | 50 | | 185 | 80 | 130 |
| Bending | 200 | 220 | 180 | 180 | Rubbery | | 270 | 100 | 190 |

TABLE 7-continued

| | Example No. | | | | | | | | |
|---|---|---|---|---|---|---|---|---|---|
| | 36 | 37 | 38 | 39 | 40 | 41 | 42 | 43 | 44 |
| modulus of elasticity (kg · mm²) | | | | | | | | | |
| Izod Impact strength (notched) (kg · cm · cm) | 44 | 32 | 41 | 30 | | could not be measured | <10 | >50 | 20 |

*Experiment could not be performed because the monomer solution solidified.

The table shows (Examples 36-38) that the three component monomer reactive solutions of the present invention have a long PL, improved workability, and low SMT/PL ratio, and the polymerization reaction readily progresses in a mold. The molded products of the invention have high Tg, high bending modulus of elasticity, and high Izod impact strength.

Examples 39-44 which do not employ a three component monomer reactive solution showed unacceptable moldability or the product properties were unacceptable.

In Example 39 the product polymerized from DCP monomer showed acceptable bending modulus of elasticity and impact strength. However, the SMT/PL ratio was high and, therefore, its moldability was unacceptable. In Example 40 the monomer was solid at room temperature and no physical characterization was possible. In Example 41 wherein VNB was the only monomer employed, the moldability was acceptable because of the low SMT/PL ratio, but the product was rubbery and therefore useless because of its low Tg value. In Example 42 the copolymerized DCP and TCP monomers gave a polymer will an acceptable Tg, but the SMT/PL ratio was too high. Accordingly, moldability was unacceptable. In Example 43, DCP and VNB monomers were copolymerized giving an acceptably low SMT/PL ratio. The moldability was acceptable, but the Tg and the bending modulus of elasticity were unacceptable. The polymer had not practical value. In Example 44 the SMT/PL ratio was low providing for acceptable moldability, but the impact strength of the polymer product was unacceptable.

EXAMPLES 45-49

In the formulation of Example 36, the elastomer was replaced with those listed in Table 8. The same experimental procedure was carried out as disclosed in Example 36. The polymer products obtained were characterized and the results listed in Table 8.

Table 8 clearly demonstrates that when EPDM or butyl rubber (IIR), which are low SP value elastomers, are used (Examples 45 and 46) the product Izod impact strength is significantly improved. When general purpose impact resistance improving agents, such as, for example, SBS, SIS or BR, are used (Examples 47-49), improvement in the Izod impact strength is not pronounced.

TABLE 8

| | Example | | | | |
|---|---|---|---|---|---|
| Elastomer | 45 EPDM | 46 Butyl Rubber | 47 SBS | 48 SIS | 49 BR |
| Properties of products | | | | | |
| Tg (°C.) | 158 | 157 | 149 | 153 | 156 |
| Bending modulus of elasticity (kg · mm²) | 210 | 210 | 200 | 190 | 210 |
| Izod impact strength (notched) (kg · cm/cm) | 42 | 40 | <10 | <10 | <10 |

Note:
EPDM: EP-65X, Nippon Goseigomu
IIR: Butyl 268, Nippon Goseigomu
SBS: Kraton TR-1101, Shell Kagaku
SIS: Quintac 3421, Nippon Zeon
BR: BR-1220, Nippon Zeon.

What is claimed is:

1. A method for extending the pot life of a bulk polymerizable reaction solution comprising adding an effective amount of a pot life adjusting agent of the formula:

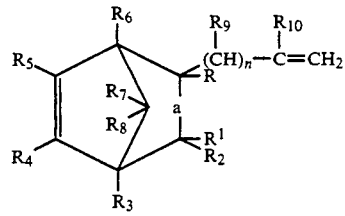

wherein R, $R_1$, and $R_2$ independently represent hydrogen, $C_1$ to $C_6$ alkyl and the monomethyl, monochloro and dichloro substituents thereof, $C_2$ to $C_6$ alkenyl and the monomethyl, monochloro and dichloro substituents thereof; $R_3$, $R_4$, $R_5$, $R_6$, $R_7$ and $R_8$ independently represent hydrogen, a methyl group or a halogen atom; $R_9$ and $R_{10}$ independently represent hydrogen or $C_1$ to $C_6$ alkyl; n is 0 to 4; and "a" represents a single or double bond with the proviso that when "a" is a double bond, R and $R_1$ are not present; to a reactive solution comprising at least one norbornene monomer having 3 or more rings in its backbone, tricylcopentadiene, a molybdenum metathesis catalyst and a cocatalyst.

2. The method of claim 1 wherein the tricyclopentadiene is selected from the group consisting of symmetrical trimers, unsymmetrical trimers and mixtures thereof.

3. The method of claim 1 wherein the norbornene monomer is selected from the group consisting of dicyclopentadiene, dihydrodicyclopentadiene, cyclopentadiene/methylcyclopentadiene codimer, 1,4-methano-1,1,4a,5,6,7,8,8a-octahydronaphthalene, tetracyclododecene, methyltetracyclododecene, ethyltetracyclododecene, dimethyltetracyclododecene, ethylidenetetracyclododecene, vinyltetracyclododecene, phenyltetracyclododecene and mixtures thereof.

4. The method of claim 1 wherein the reactive solution further comprises monomers selected from the group consisting of 2-norbornene, 5-methyl-2-norbornene, 5-ethyl-2-norbornene, 5-butyl-2-norbornene, 5-hexyl-2-norbornene, 5-ethylidene-2-norbornene, 5-phenyl-2-norbornene, cyclobutene, 5-phenyl-2-norbornene, cyclobutene, cyclopentene, cyclopentadiene, cyclooctane, cyclododecene, and mixtures thereof.

5. The method of claim 1 wherein the pot life adjusting agent is selected from the group consisting of 5-vinylbicyclo[2,2,1]hepto-2-ene, 5-isopropenylbicylo[2,2,1]hepto-2-ene, 5-vinyl-4-vinylbicyclo[2,2,1-]hepto-2-ene, 5-propenylbicyclo[2,2,1]hepto-2-ene, 5-butenyl-bicyclo[2,2,1]hepto-2-ene, 5-pentenyl-bicyclo[2,2,1]hepto-2-ene; monomethyl substitutes of the above; monochloro substitutes of the above; dichloro substitutes of the above; 5-alpha-chlorovinylbicyclo[2,2,1]hepto-2-ene; 5-vinylbicyclo[2,2,1]hepto-1,4-diene; and mixtures thereof.

6. The method of claim 1 wherein the pot life adjusting agent is added in the amount of at least 0.5 weight parts per 100 weight parts of monomer.

7. The method of claim 6 wherein the pot life adjusting agent is added in an amount of about 1 to 60 weight parts per 100 weight parts of monomer.

8. The method of claim 1 wherein the tricyclopentadiene is present in the amount from about 5 to about 60 weight percent of the total monomer in the reaction solution.

9. The method of claim 1 wherein the norbornene monomer is present in the amount from about 40 to 95 weight percent of the total monomer in the reactive soltuion.

10. The method of claim 1 wherein the reactive solution comprises 5 to 40 weight percent of tricyclopentadiene, 50 to 90 weight percent of at least one norbornene monomer, and 5 to 45 weight percent of the pot life adjusting agent wherein all weight percents are based on the total amount of monomer present in the reactive solution.

11. The method of claim 1 wherein the reactive solution further comprises a hydrocarbon based elastomer with a solubility parameter of less than 8.2.

12. The method of claim 11 wherein the reactive solution comprises a) about 10 to 50 weight percent of a norbornene monomer selected from the group consisting of tricyclic monomers, tetracyclic monomers, and mixtures thereof; b) 10 to 50 weight percent of the tricyclopentadiene; and c) 40 to 80 weight percent of the pot life adjusting agent wherein all weights are based upon the total monomer contained in the reactive solution.

13. The method of claim 12 wherein the pot life adjusting agent is present in the amount from about 45 to 70 weight percent.

14. The method of claim 11 wherein said elastomer is selected from the group consisting of natural rubber, ethylene-propylene rubber, butyl rubber, polyisoprene, and mixtures thereof.

15. A method for making a ring-opened polynorbornene molded article comprising: feeding a bulk polymerizable reactive solution into a mold, said solution comprising at least one norbornene monomer having 3 or more rings in its backbone, tricyclopentadiene, a pot life extending agent of the formula:

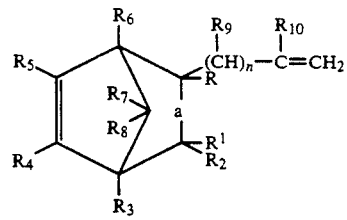

wherein R, $R_1$, and $R_2$ independently represent hydrogen, $C_1$ to $C_6$ alkyl and the monomethyl, monochloro and dichloro substituents thereof, $C_2$ to $C_6$ alkenyl and the monomethyl, monochloro and dichloro substituents thereof: $R_3$, $R_4$, $R_5$, $R_6$, $R_7$, and $R_8$ independently represent hydrogen, a methyl group or a halogen atom; $R_9$ and $R_{10}$ independently represent hydrogen or $C_1$ to $C_6$ alkyl; n is 0 to 4; and "a" represents a single or double bond with the proviso that when "a" is a double bond, R and $R_1$ are not present, a molybdenum metathesis catalyst and a cocatalyst and; polymerizing said reactive solution in said mold producing a solid article.

16. The method of claim 15 wherein reinforcing material is placed in the mold before introducing the reactive solution.

17. The method of claim 16 wherein the reinforcing material does not shift during the mold fill step.

18. The method of claim 15 wherein the tricyclopentadiene is selected from the group consisting of symmetrical trimers, unsymmetrical trimers and mixtures thereof.

19. The method of claim 15 wherein the norbornene monomer is selected from the group consisting of dicyclopentadiene, dihydrodicyclopentadiene, cyclopentadiene/methylcyclopentadiene codimer, 1,4-methano-1,1,4a,5,6,7,8,8a-octahydronaphthalene, tetracyclododecene, methyltetracyclododecene, ethyltetracyclododecene, dimethyltetracyclododecene, ethylidenetetracyclododecene, vinyltetracyclododecene, phenyltetracyclododecene and mixtures thereof.

20. The method of claim 15 wherein the reactive solution further comprises monomers selected from the group consisting of 2-norbornene, 5-methyl-2-norbornene, 5-ethyl-2-norbornene, 5-butyl-2-norbornene, 5-hexyl-2-norbornene, 5-ethylidene-2-norbornene, 5-phenyl-2-norbornene, cyclobutene, cyclopentene, cyclopentadiene, cyclooctane, cyclododecene, and mixtures thereof.

21. The method of claim 15 wherein the pot life extending agent is selected from the group consisting of 5-vinylbicyclo[2,2,1]hepto-2-ene, 5-isopropenylbicyclo[2,2,1]hepto-2-ene, 5-vinyl-4-vinylbicyclo[2,2,1]hepto-2-ene, 5-pentenyl-bicyclo[2,2,1]hepto-2-ene; monomethyl substitutes of the above; monochloro substitutes of the above; dichloro substitutes of the above; 5-alpha-chlorovinylbicyclo[2,2,1]hepto-2-ene; 5-vinylbicyclo[2,2,1]hepto-1,4-diene; and mixtures thereof.

22. The method of claim 15 wherein the pot life extending agent is added in the amount of at least 0.5 weight parts per 100 weight parts of monomer.

23. The method of claim 22 wherein the VNB pot life adjusting agent is added in an amount of about 1 to 60 weight parts per 100 weight parts of monomer.

24. The method of claim 16 wherein said reinforcing material is present in the amount of at least 20 weight percent based on the total weight of the molded article.

25. The method of claim 15 wherein the tricyclopentadiene is present in the amount from about 5 to about 60 weight percent of the total monomer in the reaction solution.

26. The method of claim 15 wherein the norbornene monomer is present in the amount from about 40 to 95 weight percent of the total monomer in the reactive solution.

27. The method of claim 15 wherein the reaction solution comprises 5 to 40 weight percent of tricyclopentadiene, 50 to 90 weight percent of at least one norbornene monomer, and 5 to 45 weight percent of the pot life adjusting agent wherein all weight percents are based on the total amount of monomer present in the reactive solution.

28. The method of claim 15 wherein the reactive solution further comprises a hydrocarbon based elastomer with a solubility parameter of less than 8.2.

29. The method of claim 28 wherein the reactive solution comprises a) about 10 to 50 weight percent of a norbornene monomer selected from the group consisting of tricyclic monomers, tetracyclic monomers, and mixtures thereof; b) 10 to 50 weight percent of the tricyclopentadiene; and c) 40 to 80 weight percent of the pot life adjusting agent wherein all weights are based upon the total monomer contained in the reactive solution.

30. The method of claim 29 wherein the pot life adjusting agent is present in the amount from about 45 to 70 weight percent.

31. The method of claim 28 wherein said elastomer is selected from the group consisting of natural rubber, ethylene-propylene rubber, butyl rubber, polyisoprene, and mixtures thereof.

32. A reactive feed composition having a prolonged pot life comprising: a) at least one norbornene monomer having 3 or more rings in its backbone; b) tricyclopentadiene, c) a molybdenum metathesis catalyst and cocatalyst; and d) a pot life extending agent of the formula:

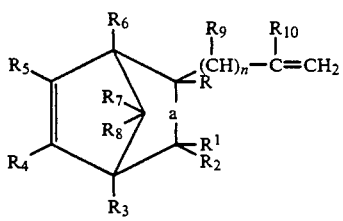

wherein R, $R_1$, and $R_2$ independently represent hydrogen, $C_1$ to $C_6$ alkyl and the monomethyl, monochloro and dichloro substituents thereof $C_2$ to $C_6$ alkenyl and the monomethyl, monochloro and dichloro substituents thereof; $R_3$, $R_4$, $R_5$, $R_6$, $R_7$ and $R_8$ independently represent hydrogen, a methyl group or a halogen atom; $R_9$ and $R_{10}$ independently represent hydrogen or $C_1$ to $C_6$ alkyl; n is 0 to 4; and "a" represents a single or double bond with the proviso that when "a" is a double bond, R and $R_1$ are not present.

33. The composition of claim 32 wherein the tricyclopentadiene is selected from the group consisting of symmetrical trimers, unsymmetrical trimers and mixtures thereof.

34. The composition of claim 32 wherein the norbornene monomer is selected from the group consisting of dicyclopentadiene, dihydrodicyclopentadiene, cyclopentadiene/methylcyclopentadiene codimer, 1,4-methano-1,4,4a,5,6,7,8,8a-octahydronaphthalene, tetracyclododecene, methyltetracyclododecene, ethyltetracyclododecene, dimethyltetracyclododecene, ethylidenetetracyclododecene, vinyltetracyclododecene, phenyltetracyclododecene; and mixtures thereof.

35. The composition of claim 32 wherein the reaction solution further comprises monomers selected from the group consisting of 2-norbornene, 5-methyl-2norbornene, 5-ethyl-2-norbornene, 5-butyl-2-norbornene, 5-hexyl-2-norbornene, 5-ethylidene-2-norbornene, 5-phenyl-2-norbornene, cyclobutene, cyclopentene, cyclopentadiene, cyclooctane, cyclododecene, and mixtures thereof.

36. The composition of claim 2 wherein the pot life adjusting agent is selected from the group consisting of 5-vinylbicyclo[2,2,1]hepto-2-ene, 5-isopropenylbicyclo[2,2,1]hepto-2-ene, 5-vinyl-4-vinylbicyclo[2,2,1]hepto-2-ene, 5-propenyl-bicyclo[2,2,1]hepto-2-ene, 5-butenyl-bicyclo[2,2,1]hepto-2-ene, 5-pentenyl-bicyclo[2,2,1]hepto-2-ene; monomethyl substitutes of the above; monochloro substitutes of the above; dichloro substitutes of the above; 5-alpha-chlorovinylbicyclo[2,2,1]hepto-2-ene; 5-vinylbicyclo [2,2,1]hepto-1,4-diene; and mixtures thereof.

37. The composition of claim 32 wherein the pot life adjusting agent is added in the amount of at least 0.5 weight parts per 100 weight parts of monomer.

38. The composition of claim 32 wherein the pot life adjusting agent is added in an amount of about 1 to 60 weight parts per 100 weight parts of monomer.

39. The composition of claim 32 wherein the tricyclopentadiene is present in the amount from about 5 to about 60 weight percent of the total monomer in the reaction solution.

40. The composition of claim 32 wherein the norbornene monomer is present in the amount from about 40 to 95 weight percent of the total monomer in the reactive solution.

41. The composition of claim 32 wherein the reaction solution comprises 5 to 40 weight percent of tricyclopentadiene, 50 to 90 weight percent of at least one norbornene monomer, and 5 to 45 weight percent of the pot life adjusting agent wherein all weight percents are based on the total amount of monomer present in the reactive solution.

42. The composition of claim 32 wherein the reactive solution further comprises a hydrocarbon based elastomer with a solubility parameter of less than 8.2.

43. The composition of claim 42 wherein the reactive solution comprises a) about 10 to 50 weight percent of a norbornene monomer selected from the group consisting of tricyclic monomers, tetracyclic monomers, and mixtures thereof; b) 10 to 50 weight percent of the tricyclopentadiene; and c) 40 to 80 weight percent of the pot life adjusting agent wherein all weights are based upon the total monomer contained in the reactive solution.

44. The composition of claim 43 wherein the pot life adjusting agent is present in the amount from about 45 to 70 weight percent.

45. The composition of claim 42 wherein said elastomer is selected from the group consisting of natural rubber, ethylene-propylene rubber, butyl rubber, polyisoprene, and mixtures thereof.

* * * * *

UNITED STATES PATENT AND TRADEMARK OFFICE
CERTIFICATE OF CORRECTION

PATENT NO. : 5,204,427

DATED : April 20, 1993

INVENTOR(S) : Masao Torii, Tomoo Sugawara, Kin-ichi Okumura, and Motoyuki Yamato It is certified that error appears in the above-identified patent and that said Letters Patent is hereby corrected as shown below:

Column 4, line 15, change "dihydrodicyclopentadoene" to --dihydrodicyclopentadiene--.

Column 5, line 5, change "ith" to --with--.

Column 5, line 6, delete "by".

Column 5, line 38, change "VND" to --VNB--.

Column 5, lines 39 and 40, change "5-vinyl-4-vinyl-4-vinylbicyclo[2,21]hepto-2-ene" to --5-vinyl-4-vinylbicyclo[2,21]hepto-2-ene--.

Column 6, line 57, change "contains" to --containers--.

Column 14, line 19, change "feel" to --feed--.

Column 14, line 42, change "wer" to --were--.

UNITED STATES PATENT AND TRADEMARK OFFICE
CERTIFICATE OF CORRECTION

PATENT NO. : 5,204,427
DATED : April 20, 1993
INVENTOR(S) : Masao Torii, et al

It is certified that error appears in the above-indentified patent and that said Letters Patent is hereby corrected as shown below:

Column 17, line 8, delete "5-phenyl-2-norbornene".
       17, line 9, delete "cyclobutene".

Column 20, lines 9 and 10, change "5-methyl-2norbornene" to
--5-methyl-2-norbornene --.

Column 20, line 15, change the dependency from claim "2" to claim
--32 --.

Signed and Sealed this

Twenty-fourth Day of May, 1994

Attest:

BRUCE LEHMAN

Attesting Officer   Commissioner of Patents and Trademarks